(12) United States Patent
Fuchs et al.

(10) Patent No.: US 8,403,558 B2
(45) Date of Patent: Mar. 26, 2013

(54) TTI INDICATOR WITH BALANCED PHOTOCHEMICAL PROCESSES

(75) Inventors: André Fuchs, Schliengen-Obereggenen (DE); Anne Veronica Carrigan, Galfingue (FR)

(73) Assignee: Bizerba GmbH & Co. KG, Balingen (DE)

( * ) Notice: Subject to any disclaimer, the term of this patent is extended or adjusted under 35 U.S.C. 154(b) by 751 days.

(21) Appl. No.: 12/520,613

(22) PCT Filed: Dec. 17, 2007

(86) PCT No.: PCT/EP2007/064019
§ 371 (c)(1),
(2), (4) Date: Jan. 6, 2010

(87) PCT Pub. No.: WO2008/083895
PCT Pub. Date: Jul. 17, 2008

(65) Prior Publication Data
US 2010/0135353 A1 Jun. 3, 2010

(30) Foreign Application Priority Data

Jan. 11, 2007 (EP) .................................... 07100389

(51) Int. Cl.
*G01K 3/00* (2006.01)
*G02B 5/23* (2006.01)
(52) U.S. Cl. ........ 374/102; 116/207; 252/582; 252/286; 374/E3.001; 428/207; 428/213; 428/412; 428/423.1; 428/473.5; 428/474.4; 428/480; 428/484.1; 428/500; 428/913
(58) Field of Classification Search .......... 116/206, 116/207, 216, 218; 252/408.1, 582, 586; 422/56, 57, 58; 424/59, 60, 400, 401; 428/207, 428/213, 412, 423.1, 446, 473.5, 474.4, 480, 428/484.1, 500, 913; 436/2, 7; 503/200, 503/201, 226; 514/241; 374/102, E03.001
See application file for complete search history.

(56) References Cited

U.S. PATENT DOCUMENTS

| | | |
|---|---|---|
| 4,917,503 A | 4/1990 | Bhattacharjee |
| 6,547,390 B1 | 4/2003 | Bernheim et al. |
| 7,081,364 B1 | 7/2006 | Haarer et al. |

(Continued)

FOREIGN PATENT DOCUMENTS

| | | |
|---|---|---|
| DE | 198 03 208 A1 | 8/1999 |
| WO | 2005/075978 A | 8/2005 |

(Continued)

OTHER PUBLICATIONS

Copending U.S. Appl. No. 11/977,197, filed Oct. 24, 2007.

*Primary Examiner* — Bijan Ahvazi
(74) *Attorney, Agent, or Firm* — Leydig, Voit & Mayer, Ltd.

(57) ABSTRACT

The invention relates to a time temperature indicator comprising a) at least one photo-chromic colorant introduced into and/or atop a matrix substrate and charged by exposure to UV light; b) at least a transparent colorless or a transparent colored light absorbing protecting layer adhered to the underlying layer a) which contains the photo-chromic colorant; characterized in that the light absorbing protecting layer comprises 1-50 wt % of an UV light absorber or an UV light absorber mixture and 0.1-10 wt % of an optical brightener wherein the weight ratio of the UV light absorber and optical brightener is 0.1-10.

20 Claims, 1 Drawing Sheet

U.S. PATENT DOCUMENTS

| | | | |
|---|---|---|---|
| 8,007,900 B2 * | 8/2011 | Hoekstra et al. | 428/207 |
| 2004/0092023 A1 | 5/2004 | Wright | |
| 2006/0145091 A1 * | 7/2006 | Patel | 250/474.1 |
| 2007/0218206 A1 | 9/2007 | Reichert et al. | |

FOREIGN PATENT DOCUMENTS

| | | |
|---|---|---|
| WO | 2006/015962 A | 2/2006 |
| WO | WO 2008049755 A2 | 5/2008 |

* cited by examiner

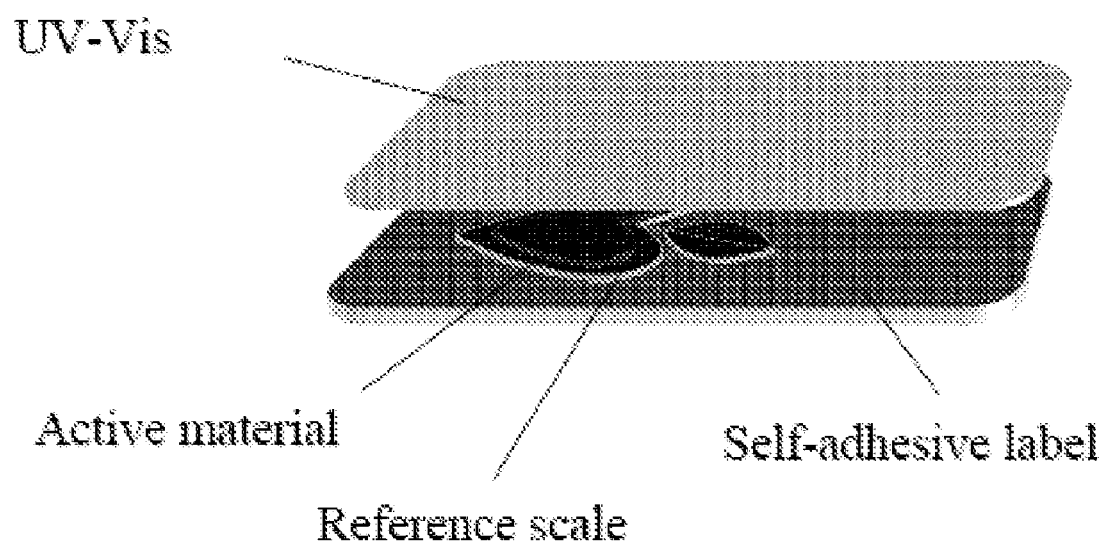

TTI INDICATOR WITH BALANCED PHOTOCHEMICAL PROCESSES

The invention relates to a system for indicating a temperature chance over time (time temperature indicator) based on a photo-chromic colorant wherein the photo-chemical process of re-charging after charging as well as the photo-bleaching reaction are balanced.

Chilled food and beverages are most commonly spoiled due to changeable temperature conditions during storage and transit. It is therefore important to indicate whether the product has been stored under the proper refrigerated conditions. A time temperature indicator (TTI) is a device that displays a visual summary of the elapsed time-temperature history of the product to which it is attached.

OnVu™ is a commercialized time-temperature indictor (TTI). The technology relies on the properties of photo-chromic colorants that change color over time, depending on temperature fluctuation. TTI is activated by a standard, commercially available UV light source (preferably light-emitting diodes known as LEDs) just before application to the package. It is known to add an UVA filter over the TTI to protect it from deliberate recharging.

Some basic limitations of most photo-chromic materials arise from the fact that the activated time temperature indicators themselves have only limited light stability. Often, photo-bleaching of the colored species is achieved even by modest ambient light.

Therefore, after exposure to activating light of a photo-chromic colorant, care must be taken to ensure that the activated colorant does not get further exposed to activating light as this will compromise the calculated time period for reversion. The time-temperature indicators of U.S. Pat. No. 7,081,364 are protected against additional light exposure by a yellow cellophane film or other yellow polymer applied after initial activating UV radiation.

The International Publication WO2005/075978 (Freshpoint) discloses a time temperature indicator comprising a photo-chromic colorant introduced into a support matrix. A poly-propylene color filter is used to avoid recharging or bleaching.

The international application PCT/EP2007/060987 filed Oct. 16, 2007, and published on May 2, 2008 as WO 2008/049755 A2 (Ciba) suggests to add an ultraviolet light and/or visible light absorbing layer which is adhered to an underlying layer containing a photo-chromic colorant and wherein the ultraviolet light and/or visible light absorbing layer comprises a polymeric binder and an ultraviolet light absorber. It is said that additional additives may be present. Optical brighteners are mentioned among other additives. However, the application is silent that optical brighteners may help to adjust the photochemical processes.

The main undesired light induced reactions of the charged photo-chromic colorant are re-charging and photo-bleaching.

Thus, the problem underlying the present invention is to find a TTI device wherein the limited light stability of the photo-chromic colorant is countervailed in such a manner that the unstable photo-chromic colorant functions as TTI over the required time frame.

Thus, the invention relates to a time temperature indicator comprising
  a) at least one photo-chromic colorant introduced into and/or atop a matrix substrate and charged by exposure to UV light;
  b) at least a transparent colorless or a transparent colored light absorbing protecting layer adhered to the underlying layer a) which contains the photo-chromic colorant; characterized in that the light absorbing protecting layer comprises 1-50 wt % of an UV light absorber or an UV light absorber mixture and 0.1-10 wt % of an optical brightener wherein the weight ratio of the UV light absorber and optical brightener is 0.1-10.

By adding a specific amount of UV light absorber and optical brightener it is possible to balance the photo-chemical processes so that re-charging of the photo-chromic colorant occurs to the same extent as photo-bleaching within the required time frame.

DEFINITIONS

The photo-chromic colorant is a photo-chromic dye or pigment, for example the photo-chromic colorant is a photo-chromic pigment.

A variety of photo-chromic dyes and pigments are known and many are commercially available. The photo-chromic colorant chosen must have predictable and appropriate rates of both UV activation and color reversion.

A particular example of a class of pigments useful as photo-chromic colorant are the spiropyranes as disclosed in WO2005/075978 (Ciba) incorporated herein in its entirety by reference.

Spiropyrans consist of a pyran ring linked via a common spirocarbon center to another heterocyclic ring. Irradiation of the colorless spiropyran with UV light causes heterolytic cleavage of the C—O bond forming the ring-opened colored species, often called the "merocyanine" form which can take on a cis-(1,2) or trans-(1,3) or the ortho-quinoidal form. The pyran ring is usually a substituted benzo or naphthopyran but the heterocylic component situated across the spirocarbon center can be chosen from a long list of ring systems such as, and not limited to, indole, benzthiazole, benzoxazole, benzselenazole, quinoline, acridine, phenanthridine, benzopyran, naphthopyran, xanthane, pyrrolidine and thiazolidine.

For example the spiropyrane used is a compound of the formula I or II

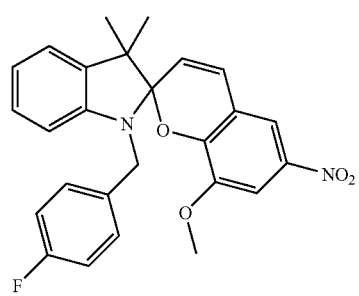

I

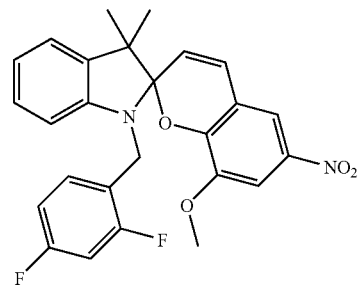

II

The term "charging" is used for the first activation push of the colorless photo-chromic colorant by intense UV radiation. The activation of the above exemplified spiropyrane is for example effected by using a 365 nm UV light emitting diode (LED). The spiropyrane pigment instantly changes its color from beige to intense blue. After charging, the blue TTI color fades depending on time and temperature. The thermal fading is the thermal induced back reaction of the blue ring-opened form to the beige colored closed form.

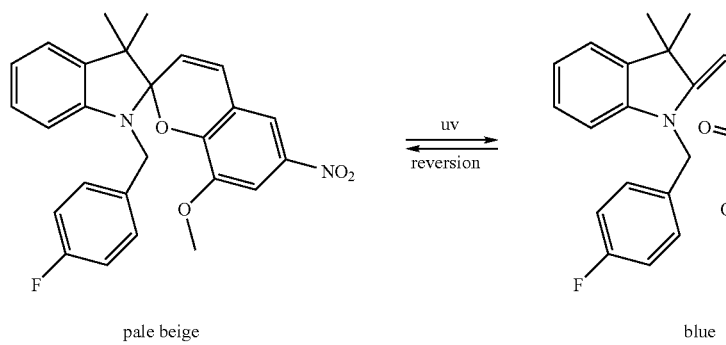

pale beige    blue

The term "re-charging" is used for the re-activation of the thermally faded TTI to the blue colored open form using UV (365 nm) or visible (up to 420 nm) light.

The term "photo-bleaching" is used for the photochemically induced fading of the TTI, which includes both the photochemical back reaction of the open to the closed form and, in addition, the light induced irreversible degradation of the TTI pigment. The photobleaching of the above exemplified spiropyrane is effected by UV/Vis light between 450 nm and 650 nm.

The photo-chromic colorant is introduced into and/or atop a matrix substrate such as polymers, glass, metals, paper, and the like, by transforming it, for example, into a printable ink that is suitable for printing using any of the printing methods known in the art, e.g., ink jet printing, flexo printing, laser printing and the like.

The required time frame depends on the product for which the time temperature history should be monitored and on the storage conditions. The time frame is e.g. 1 day up to a couple of weeks.

The UV light absorbers (UVA) are widely known compounds and many are commercially available. The amount of UVA present in the light absorbing layer depends in part on the thickness of the layer. Condition for the light absorbing layer to function is the correct optical density or absorbance. The relationship between the concentration of the UV light absorber and the layer thickness is given by Lambert-beer law which reads: $E=\epsilon \times c \times d$. Suitable layer thickness for printing inks is between 1-20 µm.

A thin layer will require a higher concentration of UVA to absorb the same amount of UV light as a thick layer. For example the layers are 1 to 1,000 µm thick, but films between 1-500 µm, 1-100 µm, 1-50 µm and 1-20 µm are very desirable.

UVAs useful in the invention are selected from hydroxyphenylbenzotriazole, benzophenone, benzoxazone, α-cyanoacrylate, oxanilide, tris-aryl-s-triazine, formamidine, cinnamate, malonate, benzilidene, salicylate and benzoate UVAs and mixtures thereof. Preferred is a tris-aryl-s-triazine UVA.

The UV Absorber must satisfy the following conditions for transmission of UV/Vis light:

The transmission must be substantially zero in the UV region where the first charging is done, The transmission must be greater than zero in the UV/Vis region where re-charging in the visible wavelength range is possible.

The UVA is incorporated using methods known and commonly practiced in the formulation of polymer and coating compositions.

Non limiting examples of suitable UVAs are:

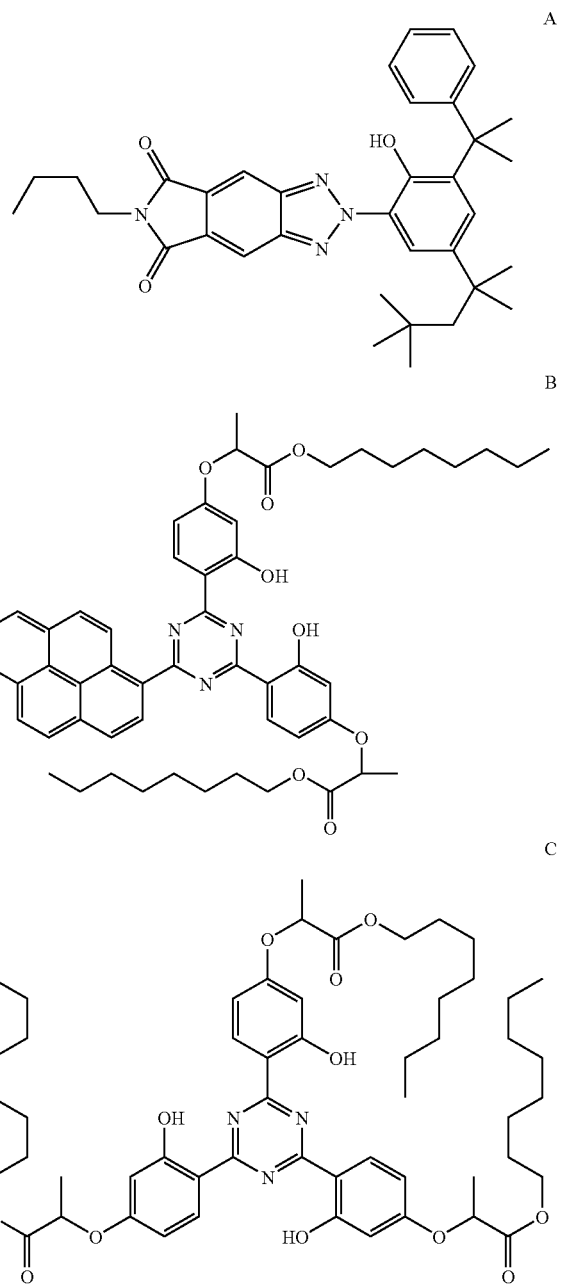

Mixtures of A, B and C or of A and C are also preferred.

The polymeric binder is a commercially available, naturally occurring or synthetic polymer. For example, the polymer may be a wax, gelatin, natural rubber, cellulose or chemically modified derivatives thereof, such as cellulose acetates, propionates and butyrates, the cellulose ethers such as methyl cellulose and also colophonium resins and derivatives.

The polymer may also be a thermoplastic, elastomeric, thermoset, elastomeric, inherently crosslinked or crosslinked polymer. Examples of such thermoplastic, elastomeric, thermoset, elastomeric, inherently crosslinked or crosslinked polymers include, but are not limited to, polyolefin, polyamide, polyurethane, polyacrylate, polyacrylamide, polycarbonate, polystyrene, polyvinyl acetates, polyvinyl alcohols, polyester, halogenated vinyl polymers such as PVC, alkyd resins, epoxy resins, unsaturated polyesters, unsaturated polyamides, polyimides, fluorinated polymers, silicon containing and carbamate polymers. The polymers may also be blends and copolymers of the preceding chemistries.

The light absorbing protecting layer may also comprise an UV light absorber mixture.

The term "UV light absorber mixture" refers to
a mixture of at least two UVA absorbers selected from hydroxyphenylbenzotriazole, benzophenone, benzoxazone, α-cyanoacrylate, oxanilide, tris-aryl-s-triazine, formamidine, cinnamate, malonate, benzilidene, salicylate and benzoate UVAs,
a mixture of an UVA absorber and an additive which absorbs in the UV/Vis region, said additive is preferably an optical brightener.

Preferred is a mixture of tris-aryl-s-triazine and an optical brightener.

The amount of optical brightener is 0.1-10 wt %, preferably 0.5-5%.

The weight ratio of optical brightener to UV absorber is 0.1 to 10 wt %, preferably 0.5-8 wt %.

The term "optical brightener" refers to compounds that absorb ultraviolet light and re-emit light in the blue region. Suitable compounds are bis(benzoxazol-2-yl) derivatives, others are distyrylbenzenes, distyrylbiphenyls, divinylstilbenes, triazinylaminostilbenes, stilbenyl-2H-triazoles, benzofurans, benzimidazoles, diphenyl pyrazolines, coumarins, naphthalimides and the like.

Preferred is a bis(benzoxazol-2-yl) derivatives such as 2,5-thiophenediylbis(5-tert.-butyl-1,3-benzoxazole).

The colored light absorbing protecting layer comprises a polymeric binder and from 1 to 50 wt % based on the total weight of the layer of an UV absorber or an UV light absorber mixture and in addition from 0.1 to 10 wt %, preferably 0.5-5 wt % of a dye or pigment.

Suitable dye's or pigments are preferably yellow or blue dyes or pigments such as Microlith Yellow 4G-K (CI PY151), Yellow 3G-K (CA. PY93), Yellow 2R-K (CA. PY83), Yellow 3R-K (CA. PY110), as well as Violet B-K (CA. PV37) and Blue 4G-K (CA. PB 15:3).

Other examples are ORASOL blue GN and Orasol Blue GL (Phthalocyanin based), Yellow 4GN (Pyridon-azo), Yellow 2GLN (Chrom-Komplex), Yellow 3R, Yellow 2RLN, Orange G (all Cobalt Komplexes).

Especially preferred is Microlith Blue A3R-K, CI generic name Pigment Blue 60 (Indanthrone), sold by Ciba and Orasol Blue BL (antrachinone) sold by Ciba.

The light absorbing layer is conveniently applied by common printing methods such as thermal transfer or ink jet processes. Low melting carriers, for example, blends of waxes and ethylene vinyl acetate are convenient binders for thermal transfer processes. For example, a composition comprising the binder and UVA (absorber/absorber mixture and/or dye or pigment) is coated onto, for example, a carrier ribbon, such as a PET carrier ribbon, and printed onto a substrate comprising the photo-chromic colorant. When applied via an ink jet process, the binder and UVA are part of a liquid composition which will generally comprise solvents, such as water and/or organic solvents, as typically encountered with ink jet inks and other ink jet formulations.

The balancing of the photochemical processes can be effected by adding an optical brightener to the UV absorber, by varying the amount of UV absorber and/or optical brightener. The photochemical degradation of the blue colored, open form of the TTI can be efficiently controlled by adding a blue colorant, which absorbs in the same wavelength range. The balancing of the photochemical processes is monitored visually. The charged time temperature indicator comprising the TTI label and the UV/Vis filter (schematically shown in FIG. 1) is partly covered for reference by a optical dense filter preventing the transmission of light and the uncovered part is exposed e.g. by a 11 W fluorescent tube (OSRAM, color index 840) distance 25 cm. The exposer value is much higher than common exposure values in supermarkets where food and beverages are stored in freezers at approximately 2° C. The covered part shows the color of the originally charged (and thermally partly faded) TTI pigment as a reference.

After exposure the color of the covered part is compared to the color of the uncovered part. When re-charging is in the same extent as photo-bleaching there is no difference between both.

Preferences

The light absorbing protecting layer is preferably colorless because of the better visibility of the TTI.

If colored, the light absorbing protecting layer preferably comprises a blue pigment or a blue dye.

An especially preferred embodiment is a time temperature indicator comprising
a) a photo-chromic colorant of the formula I or II

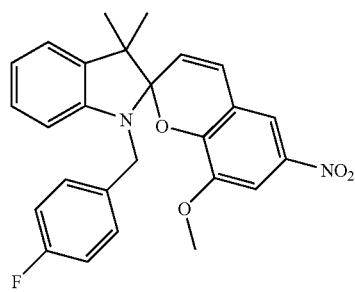

I

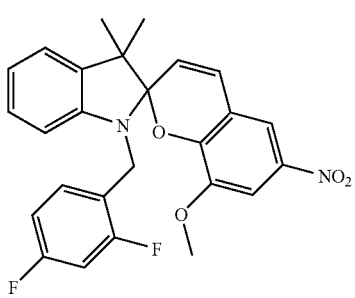

II introduced into and/or atop a matrix substrate and charged by exposure to UV light; and
b) a transparent colorless light absorbing protecting layer adhered to the underlying layer a) which contains the photo-chromic colorant;

characterized in that the light absorbing protecting layer comprises a polymeric binder and 1-50 wt % based on the total weight of the layer of a tris-aryl-s-triazine and 0.1-10 wt % of 2,5-thiophenediylbis(5-tert.-butyl-1,3-benzoxazole).

Concerning colored light absorbing protecting layer an especially preferred embodiment is a time temperature indicator comprising a) a photo-chromic colorant of the formula I or II

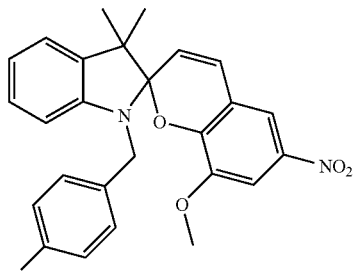

I

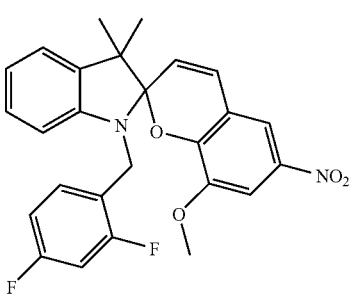

II introduced into and/or atop a matrix substrate and charged by exposure to UV light; and b) a transparent light absorbing protecting layer comprising 0.1 to 10 wt % of a blue pigment or dye adhered to the underlying layer a) which contains the photo-chromic colorant;

characterized in that the light absorbing protecting layer comprises a polymeric binder and 1-50 wt % based on the total weight of the layer of a tris-aryl-s-triazine and 0.1-10 wt % of 2,5-thiophenediylbis(5-tert.-butyl-1,3-benzoxazole).

The invention further relates to the use of a transparent colorless or colored light absorbing protecting layer comprising 1-50 wt % of an UV light absorber or an UV light absorber mixture and 0.1-10 wt % of an optical brightener to balance the photo-chemical process of re-charging and photo-bleaching within the required time frame.

EXAMPLES

The Preparation of the TTI can be Done According to WO2005/075978 (Ciba)

Finely ground powder of colorless compound of the formula

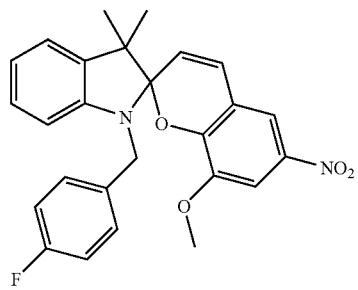 [SMILES: COc1cc([N+](=O)[O-])cc2c1OC1(C=C2)N(Cc2ccc(F)cc2)c2ccccc2C1(C)C]

was suspended in an inert solvent and adsorbed onto a paper support. Alternatively, a solution of the compound in ethanol or an ether:hexane mixture was sprayed onto the appropriate surface, such as paper, and the solvent evaporated, resulting in crystallization of the spiropyran in the support matrix.

For the following tests flexo-printed TTI-labels are used.

Preparation of the Colorless Light Absorbing Protecting Layer

| component | wt % |
| --- | --- |
| CGL 777 MPA-D | 8 |
| Uvitex OB | 0.5 |
| Clear vinylketetone varnish | 91.5 |

The composition is mixed with a dissolver 30 min at 15 m/s and gravure printed onto a transparent self adhesive polypropylene label stock (Bizerba), dry film thickness 2-2.5 µm CGL 777 MPA-D is the triazine below in methoxy propyl acetone sold by Ciba Specialty Chemicals

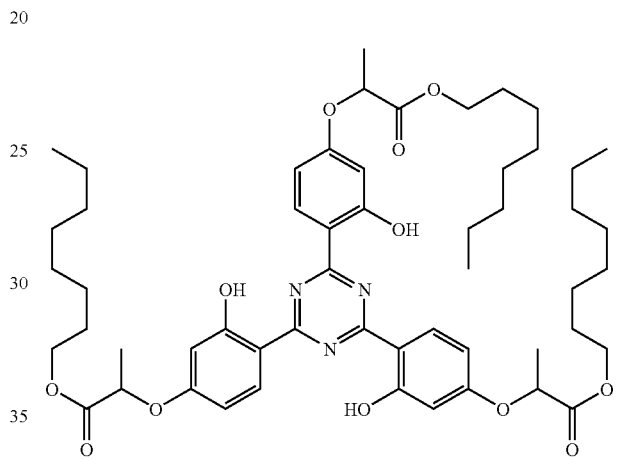

λ-max for 10 mg triazine/l in toluene, 1 cm 360 nm

UVITEX OB optical brightener 2,5-thiophenediylbis(5-tert.-butyl-1,3-benzoxazole).

The vinyl ketone varnish has the following composition:

14% VYHH vinyl chloride/vinyl acetate copolymer (made by Clear varnish UCC

10% DOWANOL PMA (propylene glycol monomethyl ether acetate)

76% MEK (methyl ethyl ketone)

A colored light absorbing protecting layer

| Component | Pigment-based | Dye-based |
| --- | --- | --- |
| CGL 777 MPA-D | 8 wt % | 8 wt % |
| Uvitex OB | 0.5 wt % | 0.5 wt % |
| Microlith Blue A3R-K | 3 wt % | |
| Orasol Blue BL | | 2 wt % |
| Clear vinylketetone varnish | 88.5 wt % | 89.5 wt % |

The composition is mixed with a dissolver 30 min at 15 m/s and gravure printed onto a transparent self adhesive polypropylene label stock (Bizerba), dry film thickness 2-2.5 µm Microlith Blue A3R-K, CI generic name Pigment Blue 60 (Indanthrone), sold by Ciba Orasol Blue BL (antrachinone) sold by Ciba FIG. 1 shows schematically the combination of the TTI label and the UV-Vis filter.

The balancing of the photochemical processes is monitored visually. The charged TTI device is partly covered for reference by an optical dense filter preventing the transmission of light and the uncovered part is exposed for 1 or 2 days by a 11 W fluorescent tube (OSRAM, color index 840) distance 25 cm, T=2° C. The covered part shows the color of the original charged (and thermally partly faded) TTI pigment.

After exposure the covered part is compared to the uncovered part. When recharging is in the same extent as photobleaching there is no difference in color.

The results are as followed:

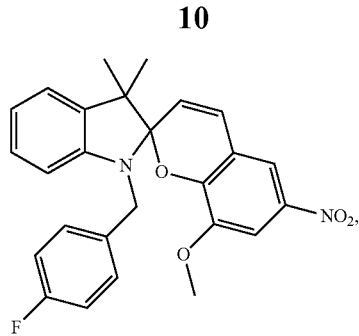

introduced into, atop, or into and atop the matrix substrate,

| Device | | 1 day exposure | 2 days exposure |
|---|---|---|---|
| A | Colorless filter CGL 777 + Uvitex OB | Photo-bleaching dominates. The blue color of the uncovered part is slightly to moderately weaker compared to the original color at the covered part. | No color difference, Photo-bleaching and re-charging balanced. |
| B | Blue filter CGL 777 + Uvitex OB + 2% Orasol Blue | Photo-bleaching dominates but to a less extent compared to device A. | No color difference, Photo-bleaching and re-charging balanced. |
| C | Blue filter CGL 777 + Uvitex OB + 3% Microlith Blue A3R-K | Same as B | Same as B |
| D Comparative | Without filter | No color difference, Photo-bleaching and re-charging balanced. | Charging dominates photo-bleaching. The uncovered part is darker blue compared to the original color at the covered part |

The above table shows that the photochemical processes are balanced after 2 days.

After 4 days of exposure the same result as after two days was obtained. Photo-bleaching and re-charging are balanced at device A-C.

The invention claimed is:

1. A time temperature indicator, comprising:
   (a) a first layer comprising (a1) a photochromic colorant introduced into, atop, or into and atop (a2) a matrix substrate, and charged by exposure to UV light;
   (b) a transparent light absorbing protecting layer adhered to the first layer (a),
   wherein the transparent light absorbing protecting layer (b) comprises 1-50 wt % of (b1) a UV light absorber or a UV light absorber mixture,
   wherein the transparent light absorbing protecting layer (b) comprises 0.1-10 wt % of (b2) an optical brightener, and
   wherein a weight ratio of the UV light absorber (b1) and optical brightener (b2) is 0-10,
   wherein a color of the indicator, after activation, fades depending on time and temperature.

2. The indicator of claim 1, wherein the transparent light absorbing protecting layer (b) is colorless.

3. The indicator of claim 2, wherein the first layer (a) comprises a photochromic colorant of formula (I)

wherein the transparent light absorbing protecting layer (b) is colorless,
wherein the transparent light absorbing protecting layer (b) further comprises (b3) a polymeric binder, and
wherein the transparent light absorbing protecting layer (b), based on a total weight of the layer (b), comprises 1-50 wt % of a tris-aryl-s-triazine, and
0.1-10 wt % of 2,5-thiophenediylbis(5-tert-butyl-1,3-benzoxazole).

4. The indicator of claim 2, wherein the first layer (a) comprises a photochromic colorant of formula (II)

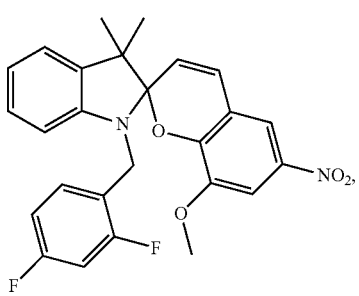

introduced into, atop, or into and atop the matrix substrate,
wherein the transparent light absorbing protecting layer (b) is colorless,
wherein the transparent light absorbing protecting layer (b) further comprises (b3) a polymeric binder, and
wherein the transparent light absorbing protecting layer (b), based on a total weight of the layer (b), comprises 1-50 wt % of a tris-aryl-s-triazine, and 0.1-10 wt % of 2,5-thiophenediylbis(5-tert-butyl-1,3-benzoxazole).

5. The indicator of claim 1, wherein the transparent light absorbing protecting layer (b) is colored, and comprises a blue pigment or dye.

6. The indicator of claim 3, wherein the first layer (a) comprises a photochromic colorant of formula (I)

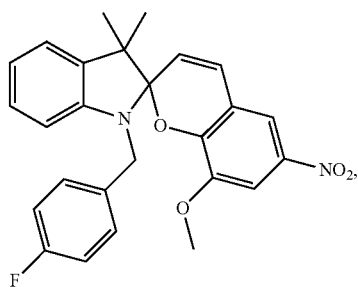

(I)

introduced into, atop or into and atop the matrix substrate, wherein the transparent light absorbing protecting layer (b) comprises 0.1 to 10 wt % of a blue pigment or dye, wherein the transparent light absorbing protecting layer (b) further comprises (b3) a polymeric binder, and wherein the transparent light absorbing protecting layer (b), based on a total weight of the layer (b), comprises 1-50 wt % of a tris-aryl-s-triazine, and 0.1-10 wt % of 2,5-thiophenediylbis(5-tert-butyl-1,3-benzoxazole).

7. The indicator of claim 5, wherein the first layer (a) comprises a photochromic colorant of formula (II)

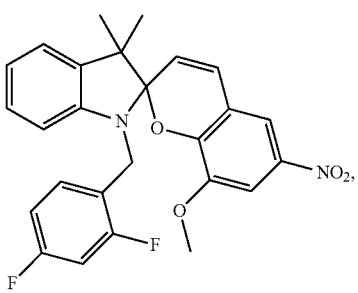

(II)

introduced, into, atop, or into and atop the matrix substrate, wherein the transparent light absorbing protecting layer (b) comprises 0.1 to 10 wt % of a blue pigment or dye, wherein the transparent light absorbing protecting layer (b) further comprises (b3) a polymeric binder, and wherein the transparent light absorbing protecting layer (b), based on a total weight of the layer (b), comprises 1-50 wt % of a tris-aryl-s-triazine, and 0.1-10 wt % of 2,5-thiophenediylbis(5-tert-butyl-1,3-benzoxazole).

8. The indicator of claim 1, wherein the photochromic colorant (a1) is a compound of formula (I)

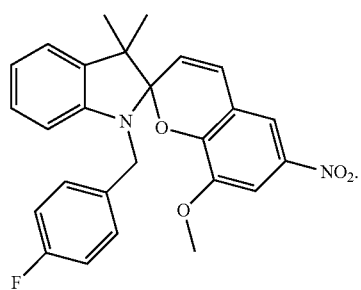

(I)

9. The indicator of claim 1, wherein the optical brightener (b2) is 2,5-thiophenediylbis(5-tert-butyl-1,3-benzoxazole).

10. The indicator of claim 1, wherein the UV absorber is a hydroxyphenylbenzotriazole, benzophenone, benzoxazone, α-cyanoacrylate, oxanilide, tris-aryl-s-triazine, formamidine, cinnamate, malonate, benzilidene, salicylate, or benzoate UVA, or a mixture thereof.

11. The indicator of claim 1, wherein the photochromic colorant (a1) is a compound of formula (II)

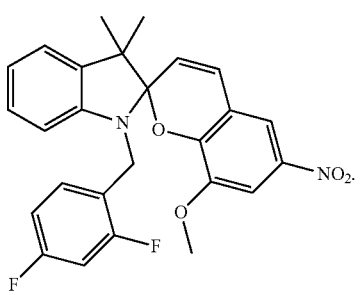

(II)

12. The indicator of claim 1, wherein the transparent light absorbing protecting layer (b) is colored, and comprises a yellow pigment or dye.

13. The indicator of claim 1, wherein the transparent light absorbing protecting layer (b) is colored, and comprises an orange pigment or dye.

14. The indicator of claim 1, wherein the transparent light absorbing protecting layer (b) is colored, and comprises a violet pigment or dye.

15. The indicator of claim 1, wherein the UV absorber (b1) comprises a compound of formula (III)

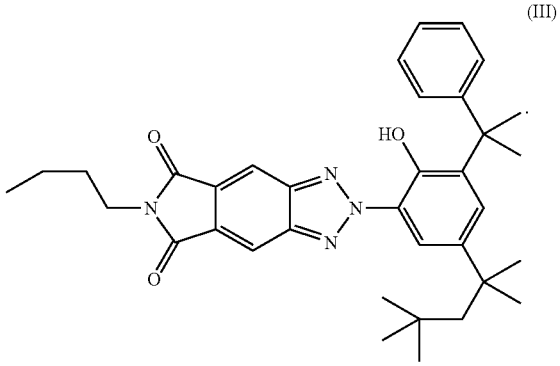 [SMILES: CCCCN1C(=O)c2cc3nn(-c4cc(C(C)(C)CC(C)(C)C)cc(C(C)(C)c5ccccc5)c4O)nc3cc2C1=O]

(III)

16. The indicator of claim 1, wherein the UV absorber (b1) comprises a compound of formula (IV)

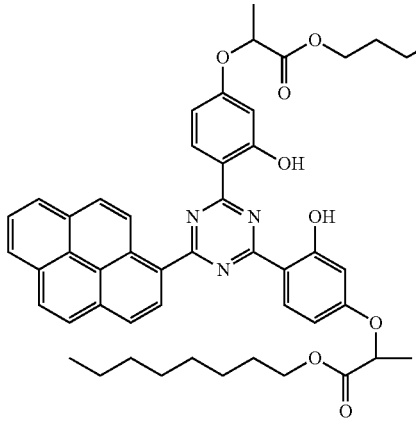

(IV)

17. The indicator of claim 1, wherein the UV absorber (b1) comprises a compound of formula (V)

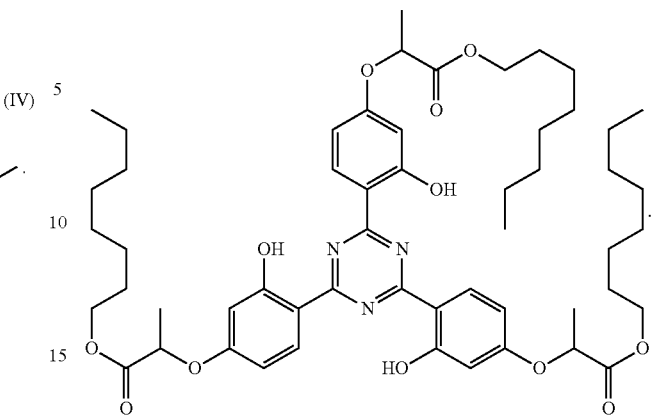

(V)

18. The indicator of claim 1, wherein the photochromic colorant (a1) comprises a spiropyran compound.

19. The indicator of claim 1, wherein the photochromic colorant (a1) consists essentially of one or more spiropyran compounds.

20. The indicator of claim 1, wherein the photochromic colorant (a1) consist of one or more spiropyran compounds.

* * * * *